(12) United States Patent
Lau

(10) Patent No.: US 6,710,477 B2
(45) Date of Patent: Mar. 23, 2004

(54) MOTOR

(75) Inventor: Kevin King Wai Lau, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 10/125,547

(22) Filed: Apr. 19, 2002

(65) Prior Publication Data

US 2002/0153783 A1 Oct. 24, 2002

(30) Foreign Application Priority Data

Apr. 21, 2001 (GB) .............................................. 0109847

(51) Int. Cl.⁷ ................................................. H02K 1/04
(52) U.S. Cl. ........................................... 310/43; 29/597
(58) Field of Search ............................ 310/43, 261, 45, 310/156.09, 156.11, 156.12, 156.14, 156.21; 29/597

(56) References Cited

U.S. PATENT DOCUMENTS

| | | | | |
|---|---|---|---|---|
| 3,246,187 A | * | 4/1966 | Toshio | 310/156.21 |
| 3,778,892 A | * | 12/1973 | Ostroski | 29/598 |
| 4,263,711 A | * | 4/1981 | Sakano et al. | 29/597 |
| 5,200,662 A | * | 4/1993 | Tagami et al. | 310/261 |
| 5,727,307 A | * | 3/1998 | Gstohl et al. | 29/597 |
| 6,069,432 A | * | 5/2000 | Norell et al. | 310/261 |

FOREIGN PATENT DOCUMENTS

| | | |
|---|---|---|
| DE | 40 04 812 A1 | 9/1991 |
| DE | 299 19 786 U1 | 4/2000 |
| EP | 0 240 670 A2 | 10/1987 |
| JP | 56-38967 A | 4/1981 |

* cited by examiner

Primary Examiner—Dang Le
Assistant Examiner—Nguyen N Hanh
(74) Attorney, Agent, or Firm—Birch, Stewart, Kolasch & Birch, LLP

(57) ABSTRACT

A double insulated rotor (10) for an electric motor has a rotor core (14) fitted to a shaft (12) by way of an insulating sleeve (24) moulded to the shaft (12).

13 Claims, 2 Drawing Sheets

MOTOR

FIELD AND BACKGROUND OF THE INVENTION

This invention relates to electric motor and in particular, to a double insulated rotor for an electric motor such as a universal motor or high voltage d.c. motor.

Generally, wound rotors comprise a shaft and a rotor core fixed to the shaft. Rotor windings are wound around poles of the rotor core to form the armature. The power of the motor comes from the interaction between the magnetic fields of the stator and rotor and the rotational force applied to the rotor core is transferred to the shaft for doing useful work such as driving a load.

The rotor core may be fixed directly onto the shaft as a press fit which usually gives a strong connection for transferring the power or torque. However, in some applications, safety specifications require that the rotor core be electrically insulated from the shaft, known as a double insulated rotor. This is a common requirement for mains voltage motors.

One way this is achieved is by insert moulding an insulator between the rotor core and the shaft. In this process, the rotor core and shaft are loosely assembled and placed in an injection mould. The mould is closed and hot plastics resin is injected into the spaces between the rotor core and the shaft to fix the core to the shaft. At the same time, end spacers and lamination end protectors or spiders may be formed integral with the insulator.

While this provides an excellent solution to the problem with the rotor core securely fixed to the shaft, it is time consuming and any change to the rotor core, such as diameter or length, requires a new mould to be produced.

A second solution involves placing the rotor core on a pre-fabricated plastics material tube. The shaft is then pressed into the tube which expands and locks the core to the shaft. This is effective and allows the size of the rotor core to be changed. However, the process requires significant force to press in the shaft to expand the tube and the longer the tube, the more difficult it is. Also, as the shaft is pressed into the tube, the shaft cannot be keyed to the tube. Under severe conditions of torque and vibration, the rotor core has been known to slip with respect to the shaft. Exact tolerances are required for the rotor core i.d., the shaft o.d. and the tube's i.d. and o.d. The smaller the rotor and shaft, the more exactly the tolerances are, giving rise to extensive post forming machining to meet the tolerance requirements to avoid slippage.

Thus, there is a need for a double insulated rotor which is easy to assemble and can accommodate variations in the rotor size, i.e., length and diameter.

SUMMARY OF THE INVENTION

Accordingly, in one aspect thereof, the present invention provides a double insulated rotor for an electric motor comprising: a shaft; an insulating sleeve moulded to the shaft; a stack of stamped laminations forming a rotor core, the rotor core having a plurality of salient poles and a central aperture receiving the shaft and insulating sleeve; a commutator mounted on the shaft; windings wound around the salient poles and terminated on terminals of the commutator, wherein: the insulating sleeve is injection moulded onto the shaft and has a substantially polygonal outer cross-section where it contacts the rotor core; and the aperture in the rotor core has a corresponding profile adapted to receive the shaft and insulating sleeve as a press fit.

According to a second aspect, the present invention provides a method of making a double insulated rotor for an electric motor, comprising the steps of: injection moulding an insulating sleeve onto a shaft; stacking a plurality of stamped motor laminations to form a rotor core having a plurality of poles and a central aperture; pressing the shaft and sleeve through the central aperture of the rotor core to position the rotor core onto a core portion of the insulating sleeve; mounting a commutator onto the sleeve adjacent the rotor core; winding coils about the poles of the rotor core and connecting the coils to terminals of the commutator, wherein the core section is formed with a substantially polygonal cross-section and the central aperture is formed with a corresponding profile.

Preferred and/or optional features are set out in the dependent claims.

BRIEF DESCRIPTION OF THE DRAWINGS

One preferred embodiment will now be described, by way of example only, in which.

DETAILED DESCRIPTION OF THE PREFERRED EMBODIMENT

Figure 1:
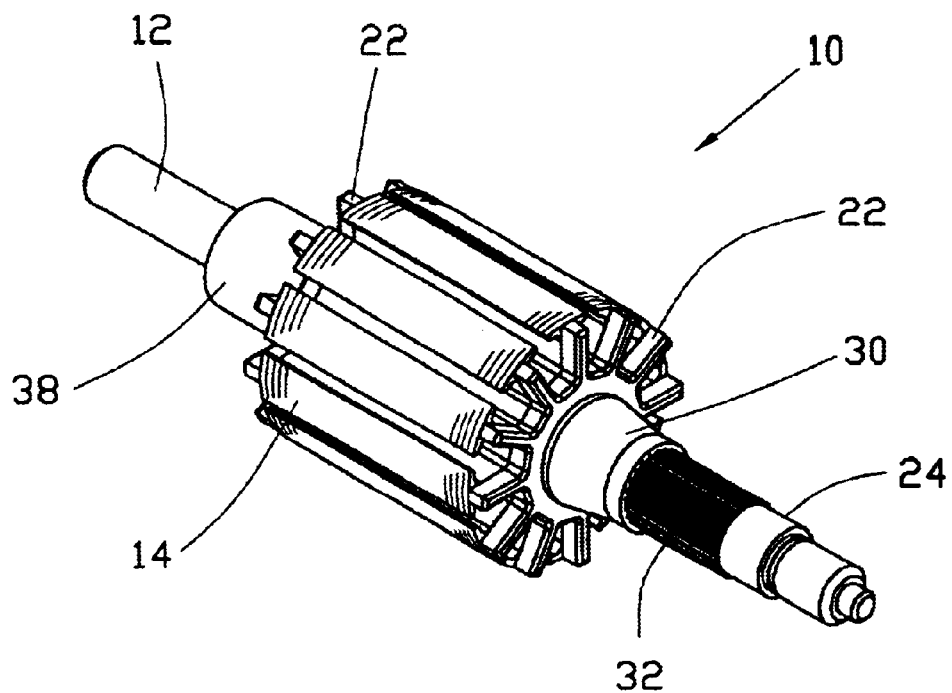
FIG. 1 is a perspective view of a partial rotor according to the preferred embodiment.

FIG. 1 is a perspective view of a rotor 10 according to the preferred embodiment with the rotor windings and commutator omitted for clarity. While the rotor windings and commutator are essential for the operation of the motor, they are well known and play no part in understanding the invention. In the complete rotor, windings would be wound around poles of the rotor and connected to terminals of the commutator.

Figure 2:
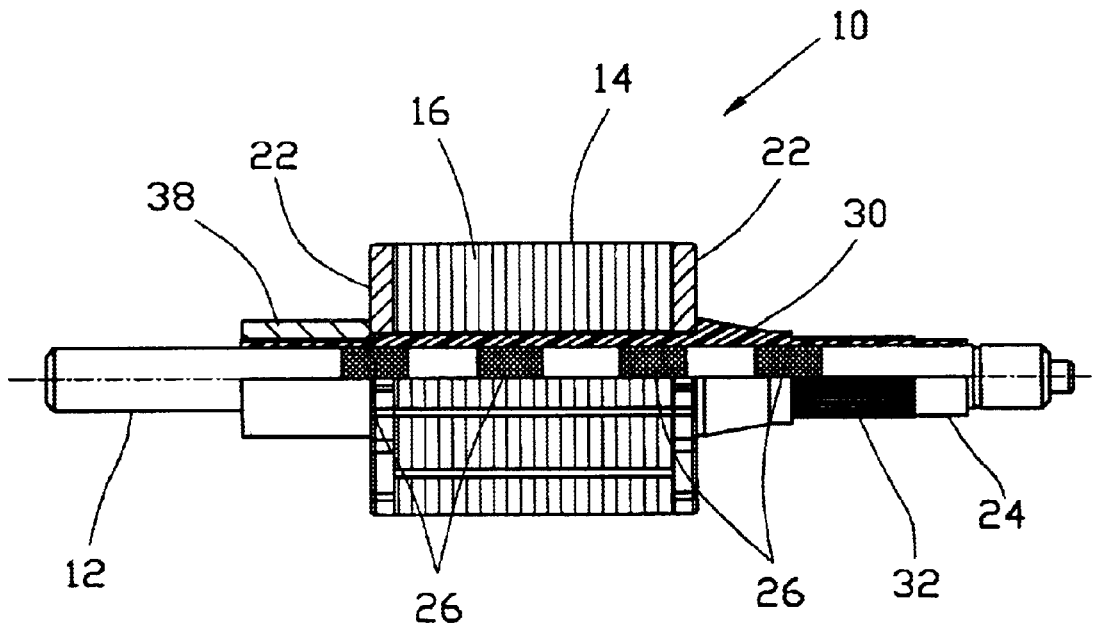
FIG. 2 is a part sectional view of the rotor of FIG. 1.
Figure 3:
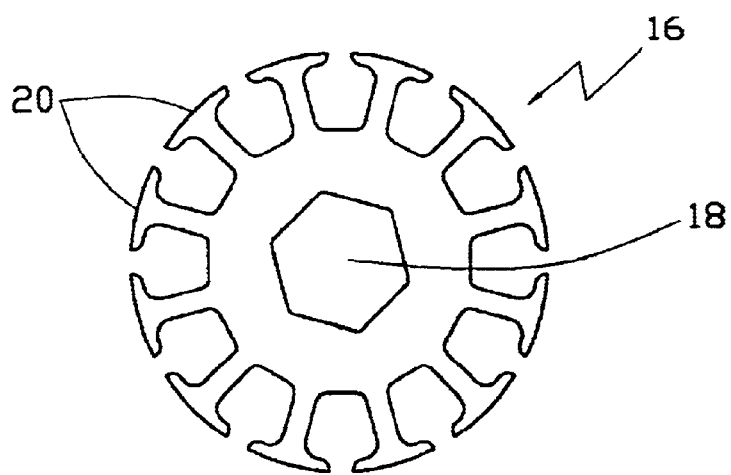
FIG. 3 illustrates a lamination of the rotor of FIG. 1.
Figure 4:
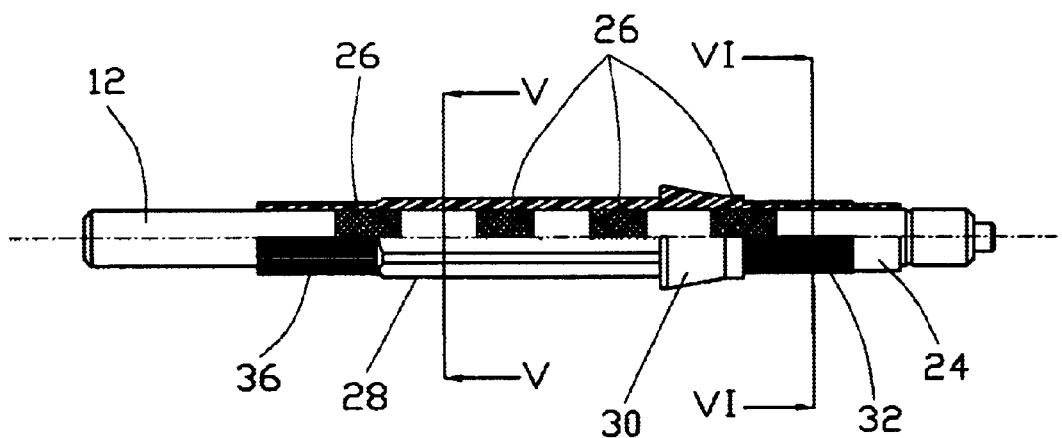
FIG. 4 is a part sectional view of a shaft and overmoulded sleeve of the rotor of FIG. 1.

As can be seen in FIGS. 1 and 2, the rotor has a shaft 12 and a rotor core 14. The rotor core 14 is formed by stacking together laminations 16 stamped from sheet electrical steel. A representative lamination is shown in FIG. 3. The laminations have a central hole 18 and a number of radially extending T-shaped fingers 20 which form the salient poles of the rotor core. The central hole is hexagonal.

Referring back to FIGS. 1 and 2, at each end of the rotor core is a rotor core end protector or spider 22. The spider 22 protects the windings from the sharp corners of the rotor core during winding and use. For a high voltage motor, slot insulation or liners would be provided to provide further insulation between the windings and the rotor core, as is well known.

The shaft 12 has an overmoulded insulating sleeve 24. The shaft also has four portions which are knurled. The knurling 26 aids the grip between the shaft and the overmoulded sleeve.

Figures 5, 6:
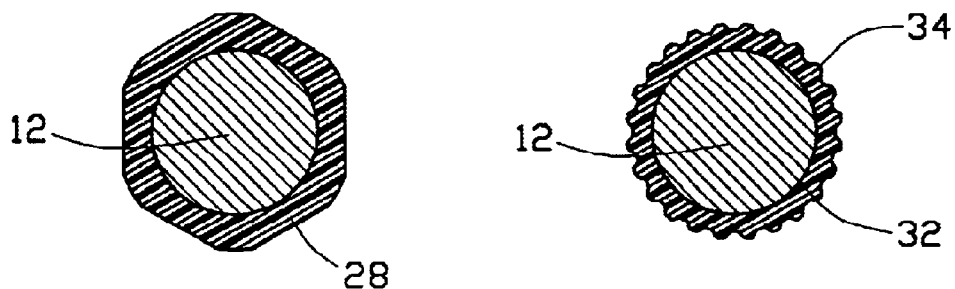
FIG. 5 is a cross section along V—V of FIG. 4.
FIG. 6 is a cross section along VI—VI of FIG. 4.

The sleeve 24 has a core section 28 adapted to receive the rotor core as a press fit. This core section 28 has a hexagonal shape with rounded edges in cross section as shown FIG. 5. The rounded edges allow for deformation of the sleeve during the fitting of the rotor core and accommodates adhesive, if required to glue the rotor core to the sleeve.

The sleeve 24 also has a stop section 30 which forms an axial abutment for the correct axial alignment of the rotor core with the sleeve 24 and hence with the shaft 12.

Adjacent the stop section 30 is a commutator section 32 for receiving a commutator. Section 32, as shown in section in FIG. 6, has a plurality of small axially running ridges 34. The ridges 34 form an interference fit with the body of the commutator allowing the commutator to be pressed into place. The valleys between the ridges provide space for adhesive used to fix the commutator to the sleeve.

At the opposite end of the sleeve 24 is a collar section 36 for supporting a collar 38 shown in FIG. 2. The collar section 36 has a cross section similar to the commutator section 32, shown in FIG. 6, with ridges for gripping the collar and valleys for accommodating the glue used to fix the collar to the sleeve. The collar provides a second axial abutment for the rotor core, preventing axial movement of the rotor core 14 with respect to the shaft 12.

Thus, to assemble the rotor 10, the shaft 12 is placed in a die of an injection moulding machine and the sleeve 24 is overmoulded directly onto the shaft 12. A first spider 22 is placed on the sleeve 24 against the stop 30. The rotor core 14 is pressed onto the core section 28 of the overmoulded sleeve until it is firmly pressing the spider 22 against the stop 30. The second spider 22 is placed in position at the other end of the rotor core 14 and the collar 38 is pressed onto the collar section 36 of the overmoulded sleeve thereby fixing the rotor 14 to the shaft 12. Adhesive such as a suitable epoxy may be added to the sleeve 24 before the rotor core 14 and collar 38 are pressed onto their respective sections of the sleeve 24.

A commutator (not shown) is now pressed onto the commutator section 36 of the sleeve 24 with adhesive being applied to the commutator section 36 beforehand.

The rotor core may now be coated with an insulating epoxy or slot liners fitted to the winding slots before the motor windings are wound about the poles of the rotor core. The windings are connected to terminals of the commutator and slot sticks may be fitted to secure the windings.

As can be appreciated, the length of the rotor core and/or the diameter of the rotor core can be changed easily without affecting the mould for the overmoulded sleeve. Indeed, even changes in the length of the shaft can be accommodated by minor changes to the die. Similarly, as the sleeve is moulded onto the shaft, the shaft can include special features to increase the grip between the shaft and the sleeve without affecting the design of the rotor core, e.g., by providing splines, knurls, keyways, projections, dimples, deformations, flats and combinations thereof or other engagement features, preventing slippage between the shaft and the sleeve.

What is claimed is:

1. A double insulated rotor for an electric motor comprising:
    a shaft;
    an insulating sleeve moulded to the shaft;
    a stack of stamped laminations forming a rotor core, the rotor core having a plurality of salient poles and a central aperture receiving the shaft and a core section of the insulating sleeve;
    a commutator mounted on the shaft;
    windings wound around the salient poles and terminated on terminals of the commutator, wherein:
        the insulating sleeve is injection moulded onto the shaft before being received by the central aperture;
        the core section of the sleeve has a substantially polygonal outer cross section where it contacts the rotor core; and
        the aperture in the rotor core has a corresponding profile adapted to receive the shaft and insulating sleeve as a press fit.

2. The rotor of claim 1 wherein the polygonal core section has rounded corners.

3. The rotor of claim 1 wherein the core section of the insulating sleeve is substantially hexagonal with rounded corners and the rotor aperture is substantially hexagonal, leaving voids between the insulating sleeve and the rotor core at the corners of the hexagonal aperture.

4. The rotor of claim 3 wherein the voids are filled with adhesive.

5. The rotor of claim 1 wherein the core is axially located on the sleeve by a step integrally moulded in the sleeve.

6. The rotor of claim 1 wherein the shaft has an engagement feature to rotationally key the insulating sleeve to the shaft.

7. A method of making a double insulated rotor for an electric motor, comprising the steps of:
    injection moulding an insulating sleeve onto a shaft;
    stacking a plurality of stamped motor laminations to form a rotor core having a plurality of poles and a central aperture;
    pressing the shaft and sleeve through the central aperture of the rotor core to position the rotor core onto a core section of the insulating sleeve;
    mounting a commutator onto the sleeve adjacent the rotor core;
    winding coils about the poles of the rotor core and connecting the coils to terminals of the commutator,
    wherein the core section is formed with a substantially polygonal cross-section and the central aperture is formed with a corresponding profile.

8. The method of claim 7 wherein the sleeve is moulded with an integral step and the rotor core is pressed onto the sleeve until the rotor core is pressed against the step, thereby setting the axial location of the rotor core with respect to the shaft.

9. The method of claim 8 further comprising fixing a collar to the sleeve adjacent an end of the rotor core remote from the step to prevent axial movement of the rotor core.

10. The method of claim 7 including forming the polygonal core section as hexagonal with rounded corners.

11. The method of claim 10 wherein the rotor core aperture is formed with a hexagonal profile so as to leave voids along the corners of the hexagon between the rotor core and the sleeve.

12. The method of claim 11 including the step of filling the voids with adhesive.

13. The method of claim further including forming engagement features on the shaft before overmoulding the sleeve onto the shaft whereby the sleeve engages the engagement features.

* * * * *